(12) United States Patent
Delaney et al.

(10) Patent No.: US 7,693,066 B2
(45) Date of Patent: Apr. 6, 2010

(54) METHODS, SYSTEMS, AND COMPUTER PROGRAM PRODUCTS FOR REDUCING SIGNALING LINK CONGESTION

(75) Inventors: Robert J. Delaney, Raleigh, NC (US); Jonathan James Palmer, Durham, NC (US); John L. Hildebrand, Hillsborough, NC (US)

(73) Assignee: Tekelec, Morrisville, NC (US)

( * ) Notice: Subject to any disclaimer, the term of this patent is extended or adjusted under 35 U.S.C. 154(b) by 1149 days.

(21) Appl. No.: 11/202,928

(22) Filed: Aug. 12, 2005
(Under 37 CFR 1.47)

(65) Prior Publication Data
US 2007/0014294 A1    Jan. 18, 2007

Related U.S. Application Data

(60) Provisional application No. 60/600,928, filed on Aug. 12, 2004.

(51) Int. Cl.
| H04L 12/26 | (2006.01) |
| H04L 1/00 | (2006.01) |
| H04L 12/16 | (2006.01) |
| H04L 12/42 | (2006.01) |
| H04L 12/403 | (2006.01) |

(52) U.S. Cl. .................. 370/236; 370/264; 370/454
(58) Field of Classification Search ............ 455/433, 455/435; 370/229, 352, 392
See application file for complete search history.

(56) References Cited

OTHER PUBLICATIONS

RFC 2960, Stream Control Transmission Protocol, Oct. 2000, IETF, all pages.*
ITU-T Q.703, Signalling Link, Jul. 1996, ITU, all pages.*
ITU-T Q.704, Signalling network functions andmessages, Jul. 1996, all pages.*
ITU-T Q.713, Signallign Connection Control Parts format and codes, Jul. 1996, all pages.*
Cisco, SS7 Signaling Architecture, Sep. 28, 2002, Cisco Systems, all pages.*

* cited by examiner

*Primary Examiner*—Kwang B Yao
*Assistant Examiner*—Adam Duda
(74) *Attorney, Agent, or Firm*—Jenkins, Wilson, Taylor & Hunt, P.A.

(57) ABSTRACT

Methods, systems, and computer program products for reducing the likelihood of signaling link congestion on a failing or recovering signaling linkset are disclosed. According to one aspect, a method for reducing or eliminating congestion on a recovered link in a previously failed linkset due to the routing of post-global title (GT) translated signaling message traffic is disclosed. When the first link in a previously failed linkset becomes available, routes associated with the recovering linkset are marked as restricted. GT translated messages are directed to the lowest cost route that is marked as allowed. If no routes are marked as allowed, messages are directed to the lowest cost route that is marked as restricted. When a predetermined number or percentage of the links in a linkset become available, routes associated with the recovering linkset are marked as allowed.

30 Claims, 7 Drawing Sheets

METHODS, SYSTEMS, AND COMPUTER PROGRAM PRODUCTS FOR REDUCING SIGNALING LINK CONGESTION

PRIORITY APPLICATION INFORMATION

This application claims the benefit of U.S. Provisional Patent Application No. 60/600,928 filed Aug. 12, 2004, the disclosure of which is incorporated herein by reference in its entirety.

TECHNICAL FIELD

The subject matter described herein relates to managing signaling message traffic on signaling links in a telecommunications signaling network. More particularly, relates to methods, systems, and computer program products for preventing signaling link congestion in a telecommunications signaling network.

RELATED ART

In signaling system 7 (SS7) signaling networks, when a signaling point determines that one of the primary linksets it uses to reach a destination fails, the signaling point sends transfer restricted (TFR) messages concerning the destination to all adjacent nodes. The TFR messages include the point codes of all destinations having routing table entries with a primary linkset corresponding to the failed linkset in the signaling point that sends the TFR messages. In response to the TFR messages, the adjacent nodes should select an alternate route to the destination that does not involve the signaling point. Thus, message transfer part (MTP)-routed traffic should not be sent to the signaling point that detected the failure and should instead be sent over an alternate route.

However, in some instances, signaling connection control part (SCCP) messages that require global title (GT) translation may continue to be sent to a signaling point after the signaling point has detected a failure. This scenario is particularly common with respect to signal transfer point (STP) signaling points that provide GT translation service in a signaling network. For example, an STP that provides GT translation service may detect a failed route to an adjacent service control point (SCP) that provides calling name service. Since messages requiring GT translation are normally addressed and MTP-routed to a point code address associated with the STP, the TFR messages described above would not affect the flow of these GT messages to the STP. That is, since the final or true destination point code address of a GT-routed message is not known until final GT translation processing is performed on the message at the STP, it is not possible for the signaling point that originates the GT message to know that the message is destined for the troubled SCP. At the STP, the post-GT traffic destined for the SCP is rerouted over an alternate linkset. In this example, it is assumed that the failed linkset corresponds to the lowest cost route to a destination.

Additionally, the adjacent signaling point that receives the TFR may not be able to redirect traffic through another route and may continue to send MTP-routed traffic destined for the troubled SCP to the STP. At the STP, this MTP-routed traffic destined for the SCP is also rerouted over an alternate linkset.

When the first link in the failed linkset recovers, current signaling point implementations mark the route as allowed and immediately direct post-GT translated traffic to the route. Signaling linksets may include up to 16 signaling links and traffic to an adjacent node is typically load shared across the 16 links. Since only one link has become available, it is likely that the link will immediately become congested because the link will immediately begin receiving a volume of traffic for which 16 links were provided to handle.

Alternately, when links in a primary linkset fail, traffic is diverted onto the remaining available linkset. When only a small percentage of the original links are available for traffic, it is likely that the remaining links will become congested.

Congestion can have adverse effects in the signaling network, including loss of signaling messages. Accordingly, there exists a long felt need for methods, systems, and computer program products for reducing signaling link congestion.

SUMMARY

According to one aspect, the subject matter described herein includes a method for reducing or eliminating congestion on a recovered link in a previously failed linkset due to the routing of post-global title (GT) translated signaling message traffic. When the first link in a previously failed linkset becomes available, routes associated with the recovering linkset are marked as restricted. The method may include attempting to direct GT translated messages to the lowest cost route that is marked as allowed. If no routes are marked as allowed, method may include directing the messages to the lowest cost route that is marked as restricted. When a predetermined number or percentage of the links in a linkset becomes available, routes associated with the recovering linkset are marked as allowed. In this manner, large volumes of signaling message traffic are generally prevented from being directed to routes associated with a recovering linkset that has a limited number of signaling link resources available. Once a predetermined, sufficient number of signaling link resources have been returned to service, routes associated with the recovering linkset may once again be utilized. Thus, the restricted linkset status designation prevents routes from being automatically used when any of their associated signaling links become available but allows routes to be used if no other routes exist to a destination.

According to another aspect, the subject matter described herein includes a method for reducing or eliminating congestion due to the routing of post-global title (GT) translated signaling message traffic on a primary linkset that has reduced capacity due to failed signaling links. When a percentage of links in a previously allowed linkset becomes unavailable, routes associated with that linkset are marked as restricted. The method of determining the route for signaling traffic may include attempting to direct GT-translated message to the lowest cost allowed route. If no routes are marked as allowed, method may include directing the messages to the lowest cost route that is marked as restricted.

According to another aspect, the subject matter described herein may include a system and method similar to that described above with respect to post-GT-translated signaling message traffic for reducing or eliminating congestion on a recovered link in a previously failed linkset due to call setup signaling messages (ISDN user part, session initiation protocol, etc.) that have undergone triggerless processing, which results in a routing address change or translation.

According to another aspect, the subject matter described herein may include a system and method similar to that described above with respect MTP-routed signaling message traffic for reducing or eliminating congestion on a recovered link in a previously failed linkset due to a TFR that was not acted upon by an adjacent signaling node.

Exemplary methods and systems for signaling link congestion avoidance are described herein as tasks, functions, and processes. It is understood that these tasks, functions, and processes may be implemented in hardware, software, firmware, or any combination thereof. For example, these tasks, functions, and processes may comprise computer executable instructions embodied in a computer readable medium for performing the congestion avoidance steps described herein.

Accordingly, it is an object of the subject matter described herein to provide a routing determination algorithm that is more tolerant during linkset transitions and that will minimize the likelihood of congesting linksets that do not have a sufficient quantity of available signaling link resources to carry nominal signaling message traffic loads.

It is another object of the subject matter described herein to provide improved methods and systems for preventing congestion on a recovering or failing link or linkset due to the routing of translated messages.

It is another object of the subject matter described herein to provide a system and method for performing routing address translation processing and subsequent route selection, which minimizes congestion on a recovering or failing linkset.

Some of the objects of the subject matter described herein having been stated hereinabove, other objects will become evident as the description proceeds when taken in connection with the accompanying drawings as best described hereinbelow.

BRIEF DESCRIPTION OF THE DRAWINGS

Preferred embodiments of the subject matter described herein will now be explained with reference to the accompanying drawings, of which.

DETAILED DESCRIPTION

According to one aspect, the subject matter described herein includes a system and method for preventing congestion on a failing or recovering linkset caused by the processing and routing of global title translated signaling message traffic. Although the subject matter described herein is described primarily with respect to messages that have undergone global title translation (GTT), the subject matter described herein may be employed to prevent congestion on a recovering linkset caused by the routing of signaling messages that have undergone any type of network routing address translation or modification. For example, routing address translations/modifications may include those translations/modifications resulting from processing associated with number portability translation services, location register routing services, message screening and redirect services, access mediation services, prepaid subscriber services, presence service, ENUM translation service and other network services. Translated signaling message types may include SS7 signaling connection control part (SCCP) messages, transaction capabilities application part (TCAP) messages, mobile application part (MAP) messages, ISDN user part (ISUP), Internet Engineering Task Force (IETF) SIGTRAN messages (e.g., M3UA, SUA), Session Initiation Protocol (SIP) messages, H.225 signaling messages, and similar communication signaling messages. The subject matter described herein may also be employed on MTP-routed traffic that was not diverted at an adjacent node after TFR reception.

According to one embodiment, the subject matter described herein includes a network routing node, such as an SS7 signal transfer point (STP) or an SS7/Internet protocol (IP) gateway that is capable of routing both SS7 message transfer part (MTP) signaling messages (e.g., ISUP, SCCP, TCAP, MAP) and IP-based signaling messages (e.g., IETF SIGTRAN messages, SIP, H.323). According to another embodiment, the subject matter described herein may include a media gateway controller or softswitch that is adapted receive, process, and transmit a variety of signaling messages including SS7 MTP signaling messages (e.g., ISUP, SCCP, TCAP, MAP) and IP-based signaling messages (e.g., IETF SIGTRAN messages, SIP, H.323).

Exemplary SS7-IP Gateway Routing Node Embodiment

Figure 1:
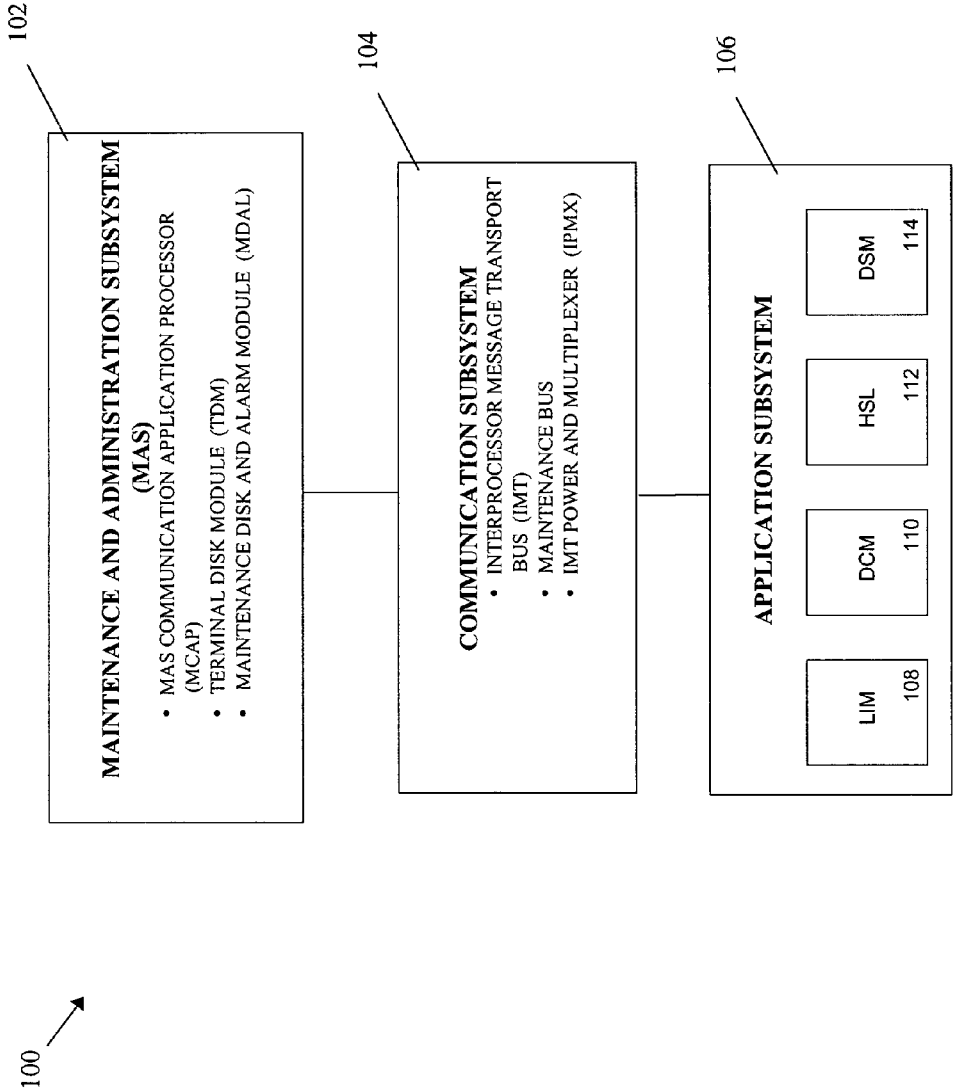
FIG. 1 is a block diagram of an exemplary SS7/Internet protocol signaling gateway (SG) routing node that is suitable for use with embodiments of the subject matter described herein.

The subject matter described herein may be implemented on an underlying hardware platform that performs functions similar to that of a communications network routing node, such as a signaling system 7 (SS7) signal transfer point (STP) or SS7/Internet protocol (IP)-capable signaling gateway (SG) routing node. Exemplary STP or SG hardware platforms suitable for use with embodiments of the present invention include the EAGLE® STP and the $IP^7$ Secure Gateway®, both available from Tekelec of Morrisville, N.C. A block diagram that generally illustrates the base internal architecture of the $IP^7$ Secure Gateway® is shown in FIG. 1. In FIG. 1, an $IP^7$ Secure Gateway® 100 includes the following subsystems: a maintenance and administration subsystem (MAS) 102, a communication subsystem 104, and an application subsystem 106. MAS 102 provides maintenance communications, initial program load, peripheral services, alarm processing and system disks. Communication subsystem 104 includes an interprocessor message transport (IMT) bus that is the main communication bus among all subsystems in $IP^7$ Secure Gateway® 100. The IMT bus includes two 1 Gbps counter-rotating serial rings.

Application subsystem 106 includes application cards or modules (e.g., printed circuit boards) capable of communicating with the other cards through the IMT bus. Numerous types of application cards can be incorporated into SG 100, including: a link interface module (LIM) 108 that interfaces with SS7 links and X.25 links; a data communication module (DCM) 110 that provides an IP signaling interface, which may be adapted to support SS7-over-IP adaptation protocols (e.g., Internet Engineering Task Force SIGTRAN protocol suite, Tekelec transport adapter layer interface, etc.) or other signaling protocols, such as SIP, H.225, wireless application protocol (WAP), simple object access protocol (SOAP), etc.; a high-speed link (HSL) module 112 that is adapted to provide signaling (e.g., SS7, SIGTRAN, SIP, H.225, WAP, SOAP, etc.) over asynchronous transfer mode (ATM) links;

and an database service module (DSM) 114 that may be adapted to support various applications including global title translation, number portability translation, flexible location register routing (e.g., G-Flex® service), network access mediation, network security, prepaid services, network inter-working applications and others.

It will be appreciated that individual LIM, DCM, and HSL communication modules may be configured in an SG routing system to terminate one or more signaling links (e.g., DS0 channels) or signaling link equivalents (e.g., IP or ATM equivalent connections or sessions). The term "signaling link," as used herein is intended to include SS7 signaling links and IP and ATM signaling-link-equivalent connections that are used to transport telecommunications signaling messages (e.g., SS7/IP messages, IETF SIGTRAN messages, SIP messages, H.225 messages, etc.). Signaling links may be grouped into virtual entities that are commonly referred to as signaling linksets. SS7 industry standards generally describe signaling linksets in terms of a grouping or collection of 16 signaling links. However, signaling linksets comprised of more than 16 signaling links or link equivalents (e.g., combined linksets) may also be employed within the scope of the present invention.

Figure 2:
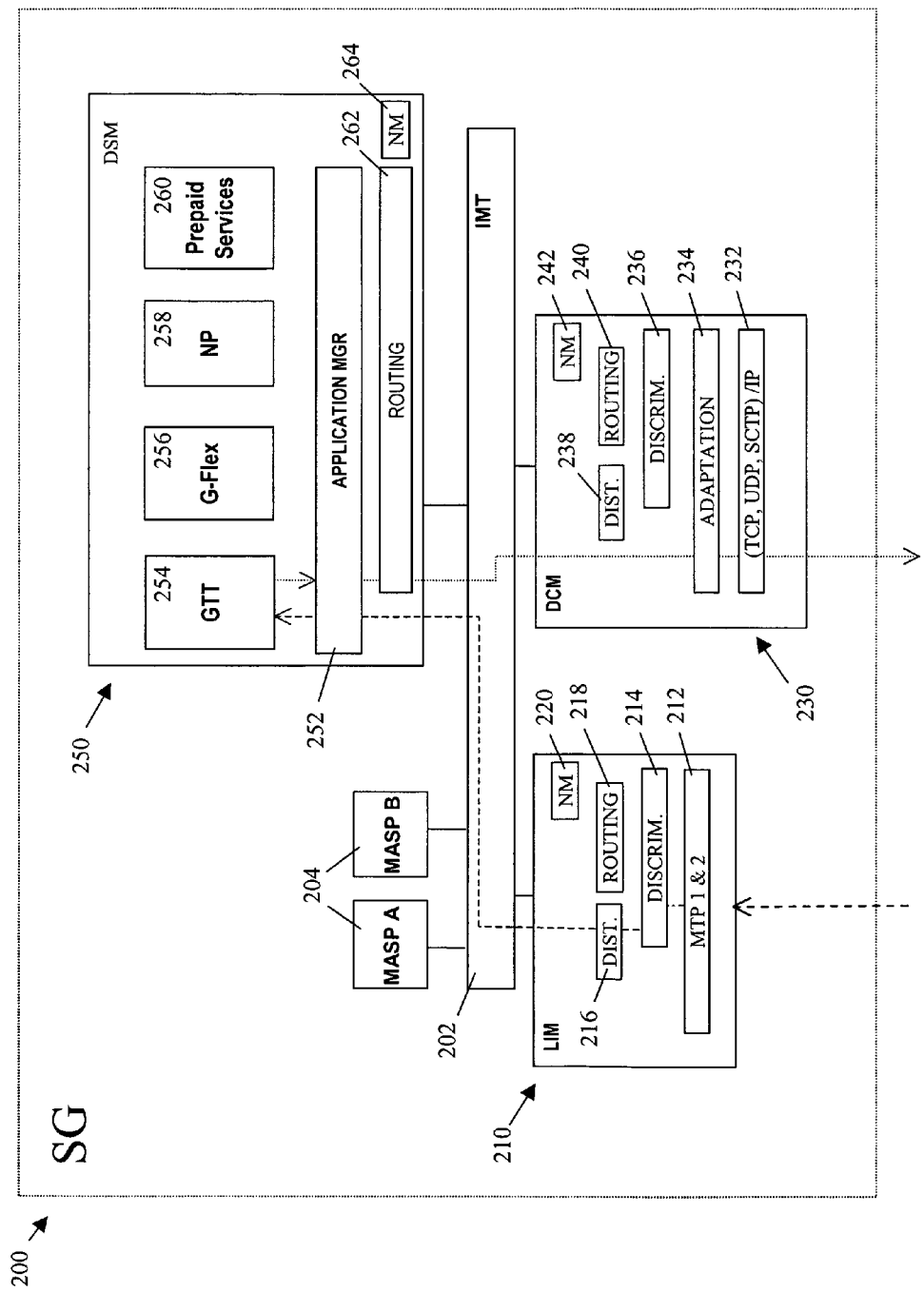
FIG. 2 is a block diagram illustrating an exemplary internal architecture of an SG routing node that includes routing address translation applications according to an embodiment of the subject matter described herein.

FIG. 2 is a system diagram illustrating an exemplary internal architecture for an SG routing node according to one embodiment of the subject matter described herein. SG routing node 200 includes a high-speed IMT communications bus 202. A number of distributed processing modules or cards are coupled to IMT bus 202 including: a pair of maintenance and administration subsystem processors (MASPs) 204, an SS7 LIM 210 for communicating with SS7 signaling points via message transfer part (MTP)-based signaling links, a DCM 230 for communicating with nodes in an IP network via IP-based signaling links (e.g., transmission control protocol, user datagram protocol, stream control transmission protocol, etc.), and a DSM 250 for hosting one or more signaling service applications. While only one of each type of processing module is depicted in FIG. 2, it will be appreciated that an SG routing node may be simultaneously configured with multiple modules of each type, thereby providing a distributed processing environment that provides a high degree of scalability and overall system reliability.

LIM 210, DCM 230, and DSM 250 may each comprise a printed circuit board or module that is physically connected to IMT bus 202. Each printed circuit board may include a communication processor programmed to send and receive messages via IMT bus 202. Each printed circuit board may also include an application processor programmed to perform various functions. For example, the application processor of LIM 210 may be programmed to perform the functions described herein for providing gateway screening, message discrimination, signaling network management, message transfer part (MTP) routing, and other signaling message processing functions. The application processor of DCM 230 may perform functions for sending and receiving signaling messages over IP signaling links. The application processor of DSM 250 may perform functions for translating signaling message routing addresses.

SS7 LIM

LIM 210 may include an SS7 message transfer part (MTP) level 1 and 2 function 212, a discrimination function 214, a distribution function 216, a routing function 218, and a network management function 220. MTP level 1 and 2 function 212 provides the facilities necessary to send and receive digital data over a particular physical medium, such as a DS0 communication link or an optical communication link (e.g., an OC-n signaling link), and also performs error detection, error correction, and provides for the sequenced delivery of SS7 message packets. Discrimination function 214 receives signaling messages from the lower MTP processing layers and performs a discrimination function, effectively determining whether an incoming message should be allowed into the switch, and if so, whether the packet requires internal processing or is simply to be through-switched (i.e., routed). Discrimination function 214 may examine and utilize a variety of message parameters during discrimination processing, including a destination point code (DPC), an originating point code (OPC), a service indicator (SI), a routing indicator (RI), a global title indicator (GTI), a translation type (TT), a nature of address indicator (NAI), a numbering plan (NP) indicator, a network domain indicator, calling party address, called party address, a message type identifier, and message payload or content information. Discrimination function 214 may also examine and utilize inbound signaling link/linkset information associated with a received signaling message during discrimination processing.

If discrimination function 214 determines that a received message requires internal processing (e.g., GTT processing), the message is passed to distribution function 216 where an internal processing subsystem or module (e.g., DSM card, adjunct processing subsystem) is selected. Distribution function 216 then forwards the message to the selected subsystem or module via IMT bus 202. If discrimination function 214 determines that a received signaling message requires routing, the signaling message may be routed by routing function 218.

NM function 220 is adapted to implement a SS7 network management procedures associated with the signaling links that are terminated on and signaling destinations that are serviced by LIM 210. In addition, NM function 220 is adapted to receive and process SS7 network management information associated with or received from other communication and processor modules/subsystems in the SG system. For example, NM function 220 is adapted to communicate with MTP layer 1 & 2 function 212 in order to monitor the status of the individual signaling links serviced by function 212. NM function 220 is also adapted to receive and process SS7 NM messages received by LIM 210 from adjacent signaling points, and to distribute NM information to other communication and processor modules/subsystems in the SG system. As such, NM function 220 is adapted to update network routing information that is accessed and utilized by routing function 218. Exemplary routing information is shown below in Tables 1 and 2.

TABLE 1

Exemplary Route Information

| DPC | LinkSet | APC | Non-Adj Status | Route Cost | Route Status |
|---|---|---|---|---|---|
| 2-2-2 | LSB | 1-1-2 | Allowed | 10 | Restricted |
|  | LSC | 1-1-3 | Allowed | 30 | Allowed |
|  | LSD | 1-1-4 | Allowed | 20 | Allowed |
| 2-2-3 | LSB | 1-1-2 | Allowed | 10 | Restricted |
| 3-1-10 | LSB | 1-1-2 | Allowed | 10 | Restricted |
| 3-1-25 | LSC | 1-1-3 | Allowed | 10 | Allowed |
| 3-1-30 | LSD | 1-1-4 | Allowed | 10 | Allowed |

TABLE 2

Exemplary Signaling Link Information

| LinkSet | Restricted Threshold | Link ID | IMT Bus Address | Comm Port | Link Status |
|---|---|---|---|---|---|
| LSB | 5 | SL1 | 2430 | A | UnAvail |
|  |  | SL2 | 2410 | B | UnAvail |
|  |  | SL3 | 3220 | A | UnAvail |
|  |  | SL4 | 2840 | A | Avail |
|  |  | SL5 | 2670 | B | Avail |
|  |  | SL6 | 5480 | A | Avail |
|  |  | SL7 | 4460 | A | Avail |
|  |  | SL8 | 3420 | B | Avail |
| LSC | 2 | SL1 | 2630 | B | Avail |
|  |  | SL2 | 2782 | A | Avail |
|  |  | SL3 | 3242 | B | Avail |
|  |  | SL4 | 3460 | B | Avail |
| LSD | 2 | SL1 | 4210 | A | Avail |
|  |  | SL2 | 4212 | B | Avail |
|  |  | SL3 | 5220 | A | Avail |
|  |  | SL4 | 3490 | B | Avail |

Table 1 illustrates exemplary SS7 signaling routes, where each route includes a destination point code (DPC) identifier, a signaling linkset identifier, an adjacent point code (APC) identifier, a non-adjacent status (NAS) identifier, a route cost value, and a route status indicator. Table 2 illustrates exemplary signaling linkset/link information, which includes a signaling linkset identifier, a linkset restricted threshold value, a signaling link identifier, an IMT bus address, a communication port identifier, and a link status identifier. The inclusion of a linkset restricted threshold value is a significant innovation with respect to the congestion avoidance according to the subject matter described herein. A restricted threshold value is set by a network operator, and indicates the number of links in a linkset that must be available in order for the linkset to be considered allowed. According to one embodiment, if the number of available links in a linkset is greater than or equal to the threshold, then the linkset is considered to be allowed. If the number of available links in a linkset is less than the threshold but greater than zero, then the linkset is considered to be restricted. If the number of number of available links in a linkset is equal to zero, then the linkset is considered to be prohibited.

Although the sample route data presented in Table 1 illustrates routing rules that are based only on a DPC, it will be appreciated that the present invention may be employed in systems with routing rules that are based on other parameters. Other routing rule parameters may include origination point code (OPC), service indicator (SI), circuit identification code (CIC), message priority indicator, class of service indicator, carrier identifier, network type, source IP address, and destination IP address.

With respect to Table 1, it will be appreciated that information associated with the ability of an adjacent point code (APC) to reach a destination may also be used to determine the availability status of a route. The status of a non-adjacent node may, for example, be determined by receipt of network management messages (e.g. TFP). This status is referred to herein as non-adjacent node status (NAS). Presented in Table 3 is an exemplary route status matrix, which illustrates exemplary NAS impact on route status determination. For example, referring to the third entry in Table 3, if the status of a linkset is allowed (based on application of the appropriate restriction threshold) and its non-adjacent status is prohibited, then the associated route status is prohibited.

TABLE 3

Exemplary Route Status Matrix

| Linkset Status | Non-Adjacent Node Status | Route Status |
|---|---|---|
| Allowed | Allowed | Allowed |
| Allowed | Restricted | Restricted |
| Allowed | Prohibited | Prohibited |
| Restricted | Allowed | Restricted |
| Restricted | Restricted | Restricted |
| Restricted | Prohibited | Prohibited |
| Prohibited | Allowed | Prohibited |
| Prohibited | Restricted | Prohibited |
| Prohibited | Prohibited | Prohibited |

In an alternate embodiment, restriction threshold values are associated with each linkset—destination/route combination, as illustrated in Tables 4 and 5. In this manner, route-specific thresholding may be implemented, which provides an operator greater flexibility with regard to controlling linkset congestion in a network.

TABLE 4

Exemplary Route Information

| DPC | Link Set | APC | Non-Adj Node Status | Route Cost | Restrict Thresh | Route Status |
|---|---|---|---|---|---|---|
| 2-2-2 | LSB | 1-1-2 | Allowed | 10 | 5 | Restrict |
|  | LSC | 1-1-3 | Allowed | 30 | 2 | Allowed |
|  | LSD | 1-1-4 | Allowed | 20 | 2 | Allowed |
| 2-2-3 | LSB | 1-1-2 | Allowed | 10 | 6 | Allowed |
| 3-1-10 | LSB | 1-1-2 | Allowed | 10 | 4 | Allowed |
| 3-1-25 | LSC | 1-1-3 | Allowed | 10 | 2 | Allowed |
| 3-1-30 | LSD | 1-1-4 | Allowed | 10 | 2 | Allowed |

TABLE 5

Exemplary Signaling Link Information

| LinkSet | Link ID | IMT Bus Address | Comm Port | Link Status |
|---|---|---|---|---|
| LSB | SL1 | 2430 | A | UnAvail |
|  | SL2 | 2410 | B | UnAvail |
|  | SL3 | 3220 | A | UnAvail |
|  | SL4 | 2840 | A | UnAvail |
|  | SL5 | 2670 | B | UnAvail |
|  | SL6 | 5480 | A | Avail |
|  | SL7 | 4460 | A | Avail |
|  | SL8 | 3420 | B | Avail |
| LSC | SL1 | 2630 | B | Avail |
|  | SL2 | 2782 | A | Avail |
|  | SL3 | 3242 | B | Avail |
|  | SL4 | 3460 | B | Avail |
| LSD | SL1 | 4210 | A | Avail |
|  | SL2 | 4212 | B | Avail |
|  | SL3 | 5220 | A | Avail |
|  | SL4 | 3490 | B | Avail |

In any event, routing function 218 is adapted to receive a message from discrimination function 214 and select a route (i.e., linkset and signaling link) over which the message should be routed to or towards the appropriate destination network address. A more detailed discussion of routing function operation is presented later in this disclosure.

IP DCM

DCM 230 shown in FIG. 2 includes an Internet protocol (IP) lower level protocol process 232, which may support a number of transport layer protocols including transmission control protocol (TCP), user datagram protocol (UDP), and stream control transmission protocol (SCTP). A signaling protocol adaptation function 234 provides the protocol encapsulation/translation functionality necessary to communicate signaling messages between networks that use different signaling protocol suites. For example, function 234 may be adapted to convert Internet Engineering Task Force (IETF) SIGTRAN SCCP user adaptation (SUA)/SCTP protocol signaling messages to SS7/MTP SCCP protocol signaling messages and vice versa. Other protocol adaptation examples that may be supported by function 234 include, but are limited to, SS7-to-session initiation protocol (SIP), SS7-to-H.323, SIGTRAN-to-SIP, SIGTRAN-to-H.323, and SS7-to-Transport Adapter Layer Interface (TALI). Regardless of the particular protocol inter-workings supported, adaptation function 234 may be used to process either inbound or outbound signaling messages.

Discrimination function 236 is adapted to provide functionality that is analogous to the LIM-based discrimination function 214, described previously. That is, discrimination function 236 is adapted to determine whether a received message should be allowed into the system (i.e., gateway screening), and also whether a received message requires additional processing (e.g., GTT number portability translation, access screening, etc.) or is simply to be through-switched (i.e., routed). Discrimination function 236 differs from the previously described LIM-based discrimination function in that function 236 may also provide discrimination service for messages associated with a wide variety of signaling and data communication protocols including SS7, SIP, IETF SIGTRAN SUA, M3UA, M2PA, H.323, WAP/WSP/WDP, and HTTP. IP DCM discrimination function 236 may examine and utilize a variety of message parameters during discrimination processing, including but not limited to, a destination IP address or URL, a source IP address or URL, a destination point code (DPC), an originating point code (OPC), a service indicator (SI), a routing indicator (RI), a global title indicator (GTI), a translation type (TT), a nature of address indicator (NAI), a numbering plan (NP) indicator, a network domain indicator, calling party address, called party address, a message type identifier, and message payload or content information. Discrimination function 236 may also examine and utilize inbound signaling link/linkset information associated with a received signaling message during discrimination processing.

If discrimination function 236 determines that a received message requires internal processing (e.g., GTT processing), the message is passed to distribution function 238 where an internal processing subsystem or module (e.g., DSM card, adjunct processing subsystem) is selected. Distribution function 238 then forwards the message to the selected subsystem or module via IMT bus 202. If discrimination function 236 determines that a message requires routing, discrimination function 236 may forward the message to routing function 240, which routes the message to the communications module associated with the outbound signaling link.

NM function 242 is adapted to implement a SS7 and IP network management procedures associated with the signaling links that are terminated on and signaling destinations that are serviced by DCM 230. In addition, NM function 242 is adapted to receive and process network management information associated with or received from other communication and processor modules/subsystems in the SG system. NM function 242 is adapted to update network routing information that is accessed and utilized by routing function 240, and as such NM function 242 is adapted to share status information with routing function 240 and other routing functions in the system so that routing rule data may be maintained with the most current view of routing system and network status possible.

With regard to received messages that do not require further processing by an internal or adjunct processing subsystem, routing function 240 is adapted to route these messages. That is, routing function 240 is adapted to receive a message from discrimination function 236, and select a route, linkset, and signaling link over which the message should be routed to its destination network address. In one embodiment, routing function 240 and NM function 242 may access route, linkset, and link status information similar to that illustrated above in Tables 1-5 with respect to the LIM-based routing and NM functions.

Route Status Algorithm

According to one aspect of the present invention, when the first signaling link in a failed linkset is returned to service, rather than marking a route associated with the recovering linkset as allowed, the route may be marked in the routing tables of the STP as restricted, indicating that the route is only to be used if all other routes associated with the same destination become either restricted or prohibited. When a predetermined number of the signaling links associated with a failed linkset recover, routes that use the recovering linkset may be marked as allowed. In one embodiment of the present invention as described previously and illustrated in Tables 1 and 2, a predetermined signaling link recovery threshold may be associated with each signaling linkset that is configured in a routing node. The threshold may define a number of available signaling links in a linkset. Once the threshold is reached, routes that use the recovering linkset are marked as allowed, indicating that route selection based on relative route costs may proceed. In an alternate embodiment, a predetermined signaling link recovery threshold may be associated with each linkset—destination/route combination that is configured in a routing node, as described previously and illustrated in Tables 4 and 5. Once a linkset/route-specific threshold is reached, the associated routes that use the recovering linkset is marked as allowed, indicating that route selection based on relative route costs may proceed. It should be appreciated that the recovery threshold can also be used to determine that a failing link may cause a linkset to transition from allowed to restricted, and that all routing decisions described herein are applicable to this transition as well.

Figure 3:
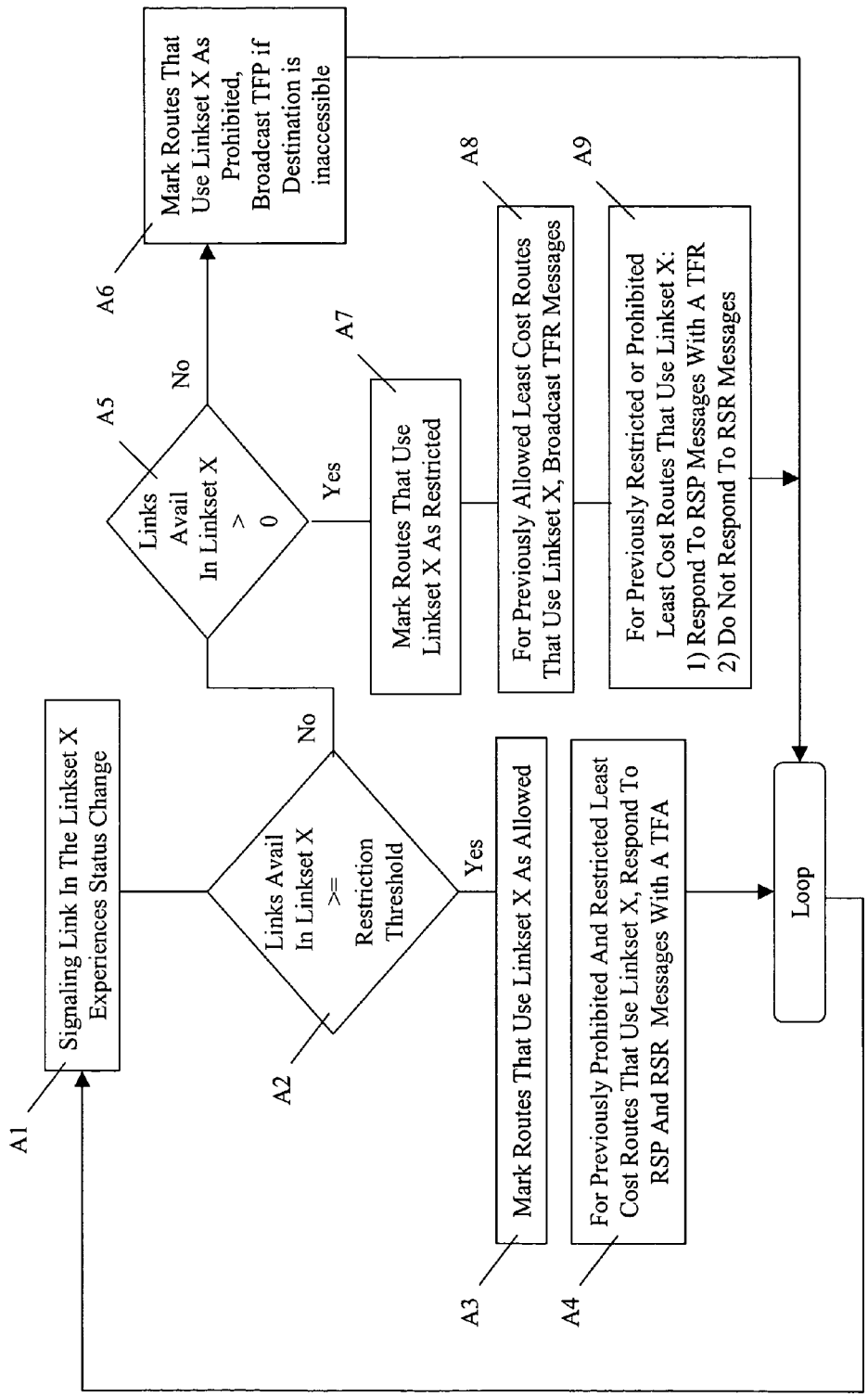
FIG. 3 is a flow chart illustrating exemplary steps that may be performed by routing and network management functions for determining route/linkset status according to an embodiment of the subject matter described herein.

Presented in FIG. 3 is a process flow diagram, which illustrates one embodiment of a route status algorithm according to the present invention. In this example, processing operations are described with respect to LIM 210, which was described previously and illustrated in FIG. 2. Beginning with step A1, a signaling link associated with linkset X experiences a change in availability status. As a result of the signaling link status change, control logic associated with routing function 218 is adapted to determine whether the number of signaling links available in linkset X is greater than or equal to the restriction threshold that has been established for linkset X, as indicated in step A2. If it is determined that the number of signaling links available in linkset X is greater than or equal to the restriction threshold, then all routes in the routing tables accessed by routing function 218 that involve linkset X are marked as allowed (step A3). Thereafter, for routes associated with linkset X as a primary linkset that were previously marked as prohibited or restricted, NM function 220 is adapted to respond to received SS7 route set test prohibited (RSP) and route set test restricted (RSR) NM messages with a transfer allowed (TFA) NM message (step A4). It will be appreciated that if a route that was previously prohibited or restricted is a lower cost route to a signaling destination than the currently active route, then a formal procedure referred to as a change-back procedure may be enacted to transition signaling message traffic associated with the destination in a sequenced and orderly manner from a higher cost route back to the recently allowed lower cost route.

If, however, it is determined that the number of signaling links available in linkset X is less than the restriction threshold, then a subsequent check is made to determine whether the number of available links in linkset X is greater than zero (step A5). If no signaling links are available in linkset X, then all routes associated with linkset X are marked as prohibited. If this linkset transition to prohibited makes a signaling node inaccessible, SS7 transfer prohibited (TFP) NM messages are generated by NM function 220 and transmitted to adjacent nodes, as indicated in step A6.

If the number of available signaling links in linkset X is greater than zero, then all routes in the routing tables accessed by routing function 218 that involve linkset X are marked as restricted (step A7). For routes associated with linkset X that were previously marked as allowed, NM function 220 is adapted to broadcast SS7 transfer restricted (TFR) NM messages to adjacent nodes associated with those routes (step A8). It will be appreciated that when SS7 cluster routing procedures are in use, transfer cluster restricted (TCR) NM messages may be generated and used in a manner similar to that described above with respect to TFR messages. For routes associated with linkset X that were previously marked as restricted or prohibited, NM function 220 is adapted to respond to a received RSP NM message with a TFR NM message, and not to respond to a received RSR NM message (step A9). With regard to change-over/change-back procedures, in the case of a route that was previously prohibited or restricted, no change-over procedure is enacted, and a higher cost allowed route will continue to be used. In the case of a route that was previously allowed, a change-over may be initiated to transition signaling message traffic associated with the destination in a sequenced and orderly manner from the recently prohibited or restricted route to the next available higher cost allowed route. When the number of available signaling links in a linkset associated with a currently restricted route meets or exceeds the restriction threshold, the status of the route may be changed to allowed. If the newly allowed route is the lowest cost route to a destination, a changeback procedure may be implemented to provide an orderly transition of traffic to the destination over the newly allowed route.

Once again, it will be appreciated that signaling link status and route status information is shared among communication modules (e.g., LIM, DCM, HSL) and application processor modules (e.g., DSM), such that the routing and NM functions on each module in the system share a common view of overall signaling link and route status in the system, and can consequently make well-informed routing decisions.

DSM Architecture and Operation

Exemplary DSM 250, shown in FIG. 2, is adapted to provide a variety of signaling message processing functions including, global title translation service 254, flexible mobile service routing (e.g., G-Flex®) translation service 256, number portability translation service 258, and pre-paid calling/messaging services 260. Additional signaling message processing functions, including but not limited to, ENUM services, presence services, location-based services, and network inter-working services may also be adapted to operate within the context of the present invention. It will also be appreciated that, in an alternate embodiment, such signaling message processing functions may be provided/hosted by one or more server platforms that are located external to the SG node, which are accessed via SS7, IP, or ATM communication links.

A signaling message application manager function 252 is adapted to receive a signaling message from a communication module (e.g., LIM, DCM, HSL), and to direct the message to the appropriate signaling message processing function or application. DSM 250 further includes a routing function 262 and a network management function 264 that are similar to the previously described LIM- and DCM-based routing and NM functions.

For the purposes of illustration, only the functionality and operation of exemplary global title translation service application 254 is described in detail herein. However, it will be appreciated that other signaling message processing applications that translate or modify the routing address of a signaling message may also be employed in various embodiments in accordance with the teachings of the present invention. It may also be applied to standard MTP-routed traffic that was not diverted by NM TFRs.

Figure 4:
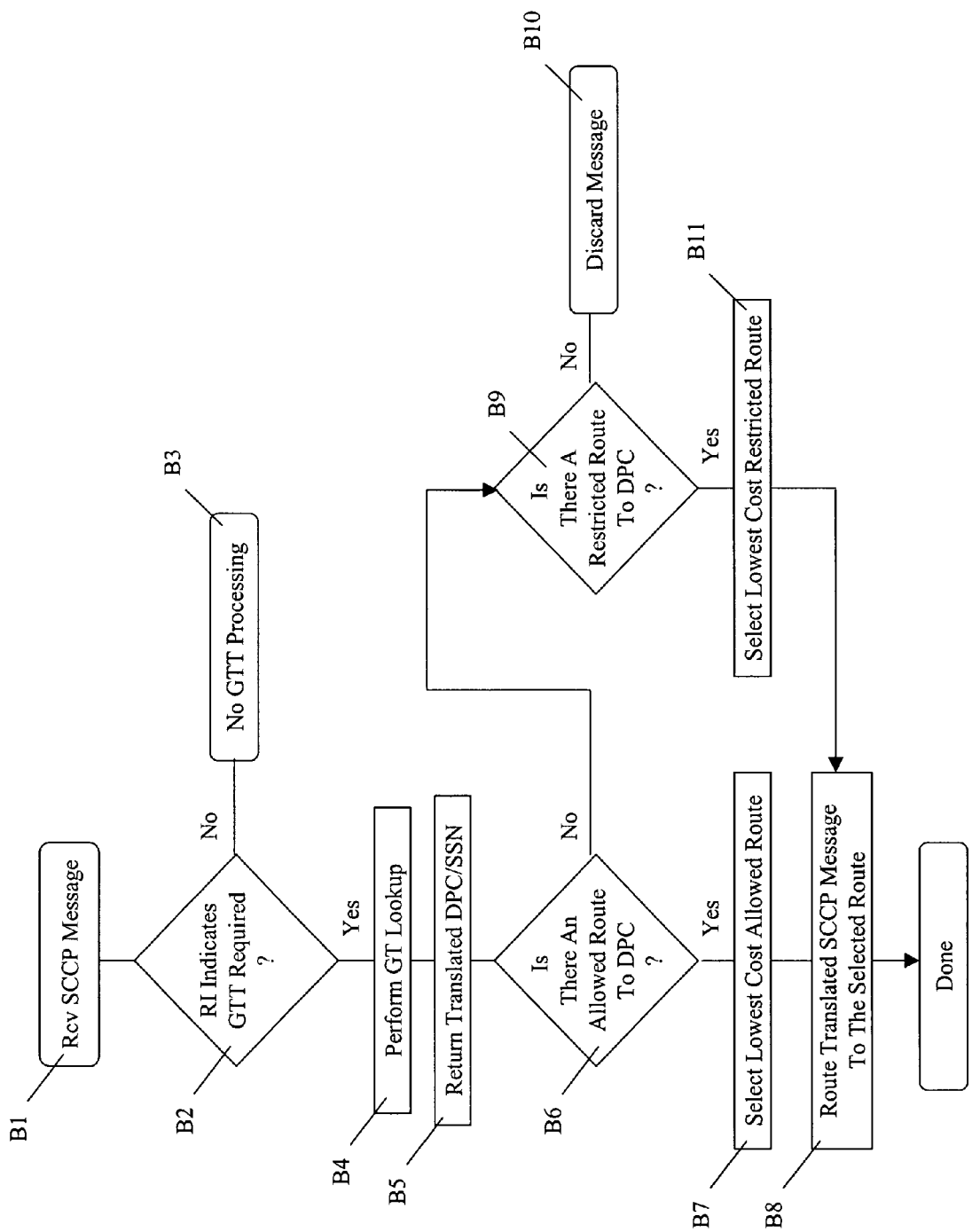
FIG. 4 is a flow chart illustrating exemplary steps associated with global title translation processing and subsequent route selection according to an embodiment of the subject matter described herein.

FIG. 4 is a message processing flow diagram, which illustrates exemplary global title translation processing and post-processing route selection that is performed on DSM 250. In step B1, an SCCP message is received by DSM 250 from LIM 220 (or DCM 230). Application manager 252 examines a routing indicator (RI) parameter contained in the SCCP message, and determines whether the SCCP message requires global title translation processing (step B2). If it is determined that the message does not require GTT processing, application manager 252 may further determine if the message requires processing by another provisioned application (step B3).

If it is determined that the message requires GTT processing, the SCCP message is directed to GTT application 254, where one or more lookups are performed in a GTT routing address translation database using one or more parameters contained in the SCCP message (e.g., a translation type parameter, a global title indicator parameter, a nature of address indicator, a numbering plan indicator, a network domain indicator, global title address), as indicated in step B4. In response, the GTT routing address translation database returns DPC and SSN routing address information (B5). The returned DPC and SSN are inserted in the MTP layer 3 portion of SCCP message, and the translated SCCP message is directed to routing function 262. Routing function 262 is adapted to examine the MTP layer 3 DPC parameter value and determine whether any allowed routes exist to the destination (B6). If there is at least one allowed route to the destination, then routing function 262 is adapted to select the lowest cost, allowed route to the specified DPC using routing information similar to that previously presented in Tables 1 through 5 (B7). The translated message is then routed to the destination using the selected route, as indicated in step B8.

If no allowed routes to the target destination exist (e.g., all other routes to the target destination are prohibited or restricted), then routing function 262 is adapted to determine whether any restricted routes exist to the destination (B9). If there are no restricted routes to the destination, then the SCCP message may be discarded and the message originator notified of the routing failure (B10).

If, however, there is at least one restricted route to the destination, then routing function 262 is adapted to select the lowest cost, restricted route to the specified DPC using routing information similar to that previously presented in Tables 1 through 5 (B11). The translated message is then routed to the destination using the selected route, as indicated in step B8.

Exemplary Network Implementation

Figure 5A:
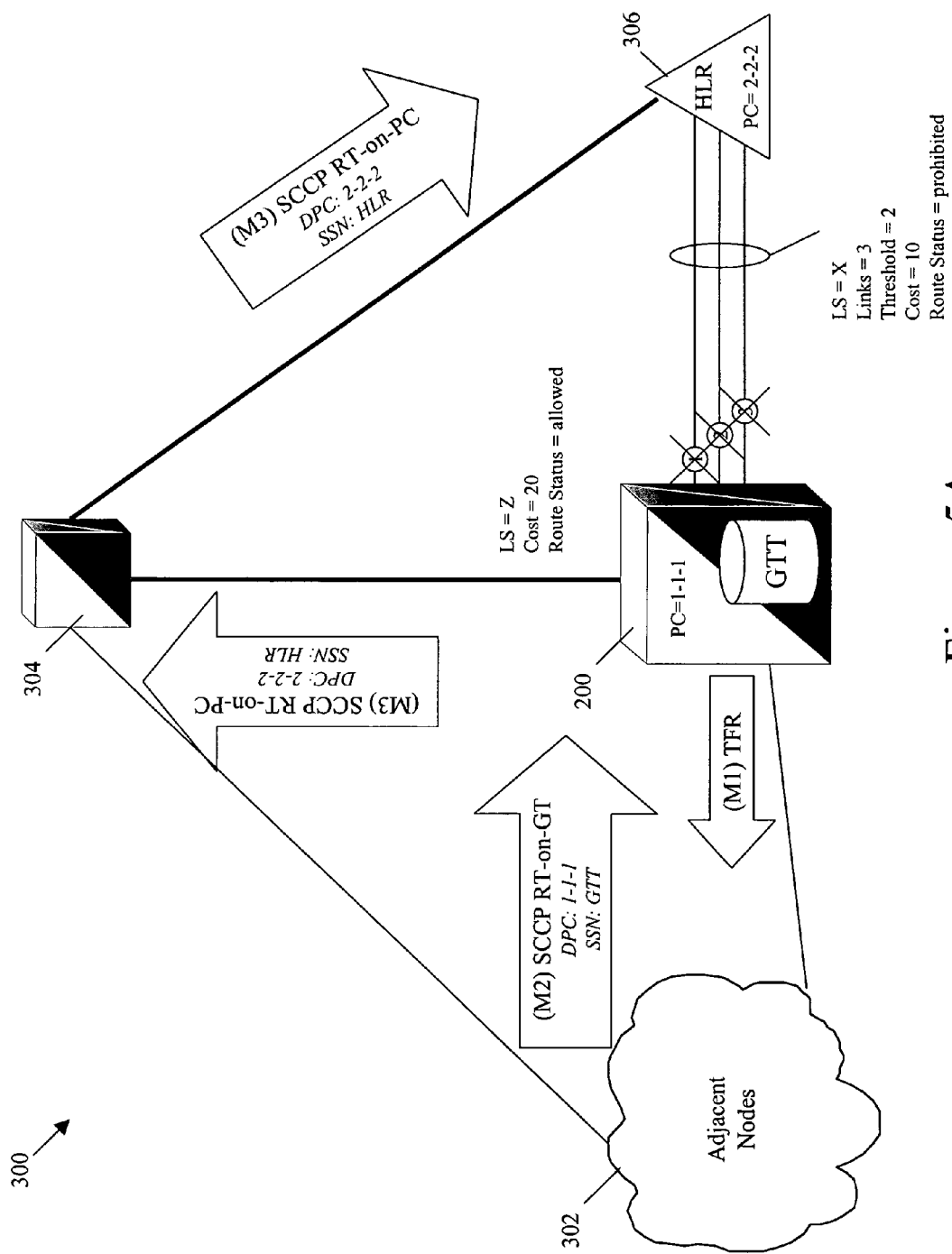
FIGS. 5A-5C are network message flow diagrams that illustrate exemplary route status scenarios and corresponding route selection according to an embodiment of the subject matter described herein.
Figure 5B:
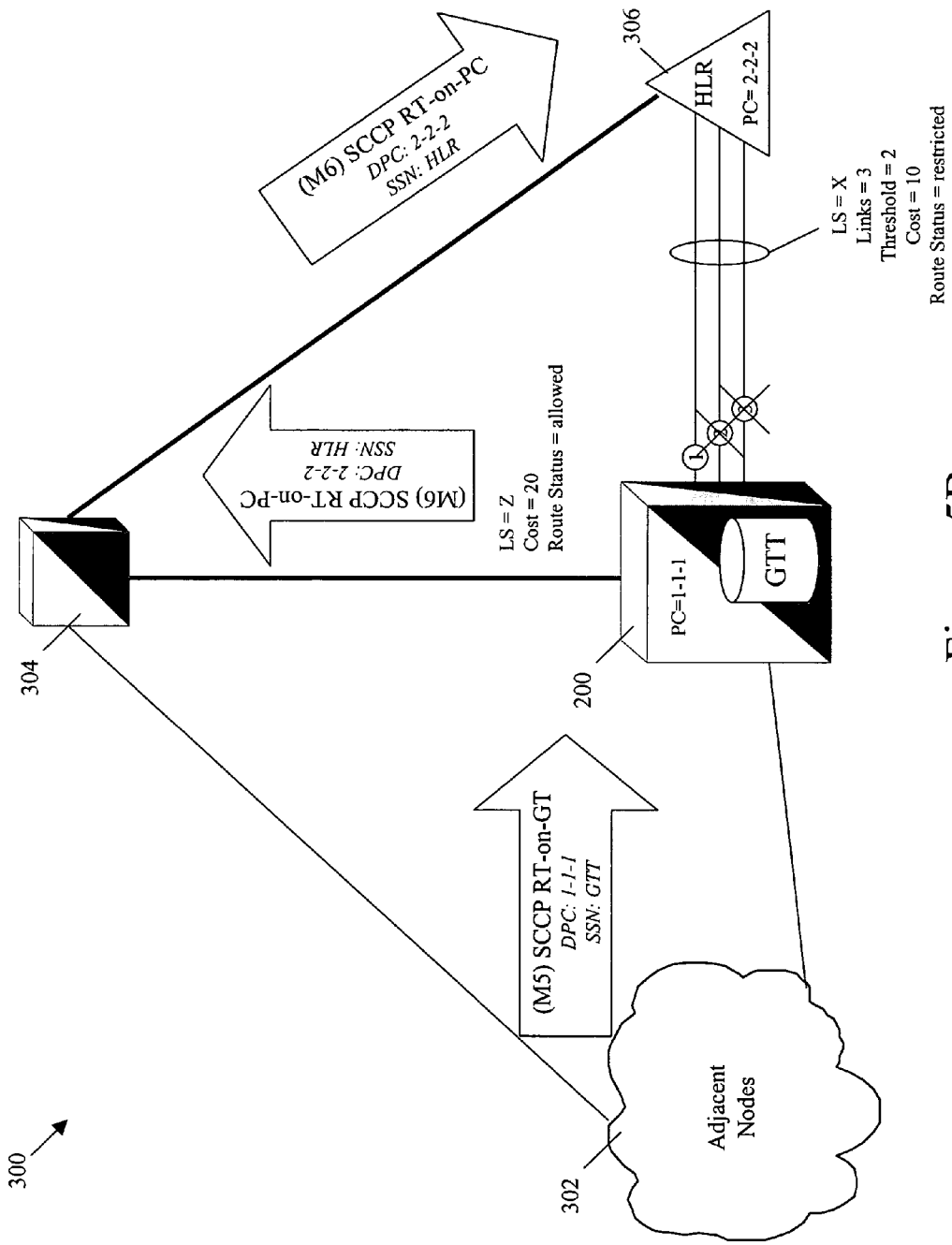
Figure 5C:
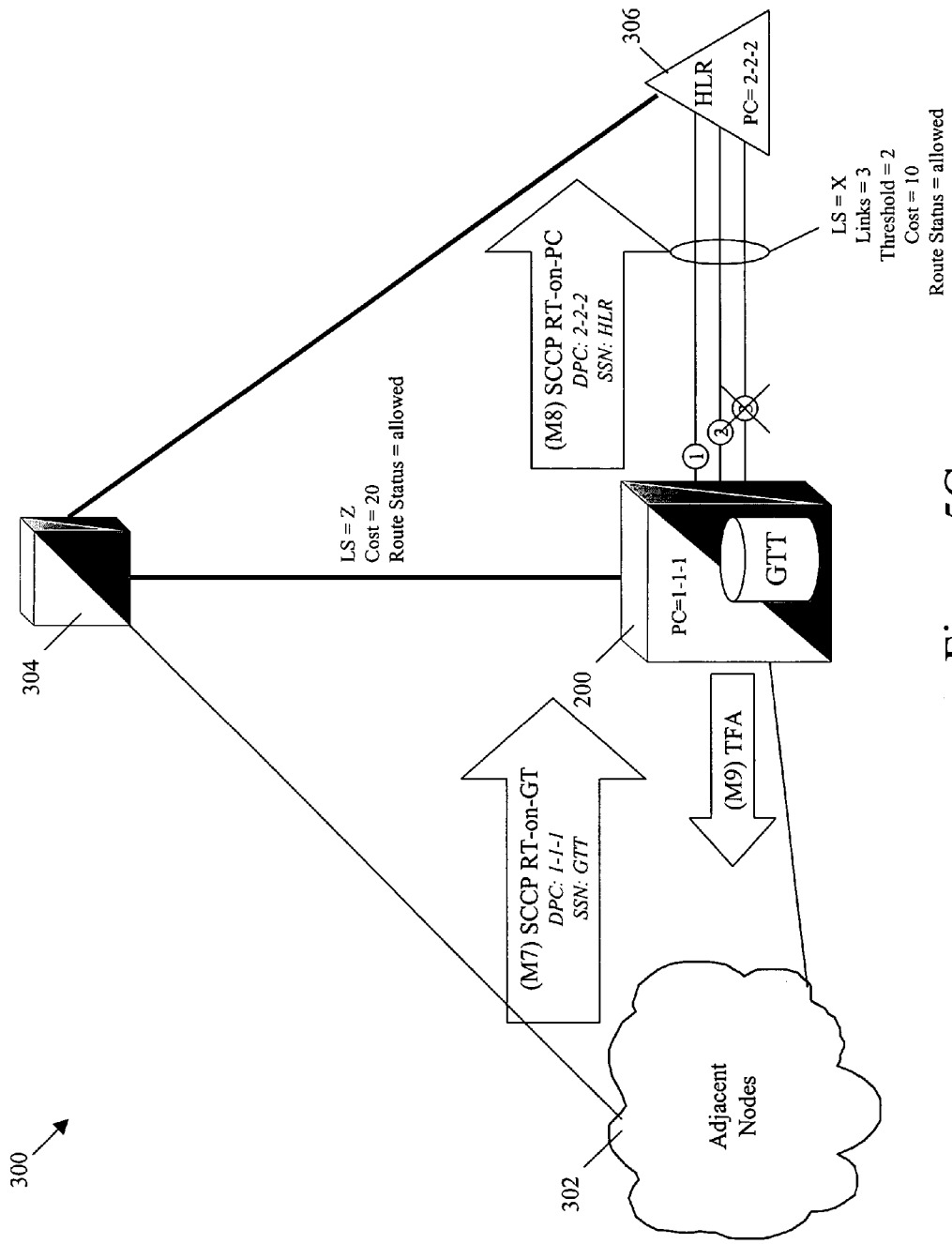

FIGS. 5A-5C illustrate an exemplary network implementation of a routing node that includes a thresholded routing algorithm according to one embodiment of the present invention. This series of figures includes a signaling network environment 300, which includes SG routing node 200, adjacent signaling nodes 302, a mate routing node 304, and a home location register (HLR) 306. SG routing node 200 is assigned an SS7 point code of 1-1-1 and includes a GTT subsystem for performing GTT for SCCP messages that are global title addressed. HLR 306 is assigned an SS7 point code of 2-2-2. A signaling linkset X, which includes 3 signaling links for illustrative purposes, is adapted to communicate signaling messages between SG 200 and HLR 306. Exemplary linkset X has an associated route cost value of 10 to HLR 306 and is configured with a restriction threshold value of 2. Likewise, a signaling linkset Z is adapted to communicate signaling messages between SG 200 and mate SG node 304. Signaling linkset Z has an associated route cost value of 20 to HLR 306.

FIG. 5A illustrates a scenario where all of the signaling links in linkset X fail, and the route to HLR 306 from SG 200 is consequently prohibited. When the last signaling link in linkset X fails, an SS7 TFR NM message (M1) is generated by SG 200 and broadcast to adjacent nodes 302. The TFR message serves to redirect, if possible, the flow of signaling messages to SG 200 that are MTP-addressed to the point code of HLR 306 (i.e., PC=2-2-2). However, messages that require SG 200 to perform GTT processing will continue to be routed to SG 200, as they are addressed to a point code and subsystem that is associated with SG 200 (i.e., PC=1-1-1, SSN=GTT). Such SCCP messages requiring GTT address translation processing may include information (e.g., SCCP routing indicator=route on global title) that identifies the message as requiring GTT processing. SCCP message M2 is an example of such a route-on-global title SCCP message that is received by SG 200 after TFR message M1 has been broadcast.

SCCP message M2 is received by SG 200 and is subsequently processed by an internal GTT translation application or subsystem. As a result of the GTT translation, a new network destination address, that of HLR 306 (i.e., PC=2-2-2) is determined for the message. The new address is inserted in the message, and route selection is performed. The lowest cost route to HLR 306 is over linkset X (i.e., route cost=10), however, the route to HLR 306 involving linkset X is prohibited since no signaling links in linkset X are available. Although the route to HLR 306 from SG 200 involves linkset Z, which has a route cost of 20, this is the only allowed route to the destination and consequently it is selected as the route for message M3. Message M3 is subsequently relayed to HLR 306 via SG node 304.

FIG. 5B illustrates a scenario where the first signaling link in linkset X recovers and becomes available to communicate messages to HLR 306. In this case, SG 200 marks the route to HLR 306 associated with linkset X as restricted, since the restriction threshold for linkset X is 2. SCCP message M5 is received by SG 200 and is subsequently processed by an internal GTT translation application or subsystem. As a result of the GTT translation, a new network destination address, that of HLR 306 (i.e., PC=2-2-2) is determined for the message. The new address is inserted in the message, and route selection is performed. The lowest cost route to HLR 306 is over linkset X (i.e., route cost=10), however, the route to HLR 306 involving linkset X is restricted since the number of available signaling links in linkset X is less than the restriction threshold value of 2. Although the route to HLR 306 from SG 200 involves linkset Z, which has a route cost of 20, this is the only allowed route to the destination and consequently it is again selected as the route. Message M6 is subsequently relayed to HLR 306 via SG node 304.

FIG. 5C illustrates a scenario where the second signaling link in linkset X recovers and becomes available to communicate messages to HLR 306. In this case, SG 200 broadcasts an SS7 TFA message M9 to adjacent nodes 302 and marks the route to HLR 306 associated with linkset X as allowed, since the number of available signaling links in linkset X is greater than or equal to the restriction threshold value of 2. SCCP message M7 is received by SG 200 and is subsequently processed by an internal GTT translation application or subsystem. As a result of the GTT translation, a new network destination address, that of HLR 306 (i.e., PC=2-2-2) is determined for the message. The new address is inserted in the message, and route selection is performed. The lowest cost route to HLR 306 is over linkset X (i.e., route cost=10), which is now allowed. Message M8 is subsequently relayed to HLR 306 via SG node 200.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for determining a status of a route to a signaling destination, the method comprising:
   at a network signaling node:
   (a) detecting a change in status associated with a signaling link in a signaling linkset;
   (b) in response to detecting the change in the status, determining a number of available signaling links in the linkset and determining whether that number has a first or a second relationship with respect to a threshold value;
   (c) in response to determining that the number of available signaling links in the linkset has the first relationship with respect to the threshold value, indicating that a route associated with the linkset is allowed; and
   (d) in response to determining that the number of available signaling links in the linkset has the second relationship with respect to the threshold value, indicating that the route associated with the linkset is restricted.

2. The method of claim 1 comprising determining whether the number of available signaling links in the linkset is zero, and, in response to determining that the number of available signaling links in the linkset is zero, indicating that the linkset is unavailable.

3. The method of claim 1 wherein the first predetermined relationship includes the number of available signaling links being greater than the threshold value.

4. The method of claim 1 wherein the second predetermined relationship includes the number of available signaling links being less than or equal to the threshold value.

5. The method of claim 1 comprising maintaining a status of the route in a routing table and wherein indicating that the route is restricted includes marking the route status as restricted in the routing table.

6. The method of claim 1 wherein indicating that the route is restricted includes communicating a restricted status for the route among processor modules in a routing system.

7. The method of claim 1 wherein indicating that the route is restricted includes sending a transfer restricted (TFR) message to at least one adjacent node.

8. The method of claim 1 comprising refraining from routing messages over the restricted route in response to determining that an alternate route to the destination exists.

9. The method of claim 1 routing messages over the restricted route in response to determining that the restricted route is the last available route to the destination.

10. A method for selecting a route to a signaling destination, the method comprising:
at a network signaling node:
(a) receiving a signaling message having a signaling destination;
(b) determining whether an allowed route exists to the signaling destination;
(c) in response to determining that an allowed route to the signaling destination exists, selecting the allowed route to the signaling destination;
(d) in response to determining that an allowed route to the signaling destination does not exist, selecting a restricted route to the signaling destination; and
(e) routing the signaling message over the selected route.

11. The method of claim 10 wherein receiving a signaling message includes receiving a signaling message at a routing node, the signaling message being global-title-addressed to the signaling destination.

12. The method of claim 10 wherein selecting the allowed route to the signaling destination includes selecting a lowest cost allowed route to the destination.

13. The method of claim 10 wherein selecting a restricted route to the destination includes selecting a lowest cost restricted route to the destination.

14. The method of claim 10 wherein determining whether an allowed route exists to a signaling destination includes examining route status information contained in a routing table.

15. A method for managing and administering cost-weighted signaling routes, the method comprising:
at a network signaling node:
(a) detecting a first change in status associated with a signaling link in a linkset; and
(b) in response to detecting the first change in the status of a signaling link associated with a linkset:
(i) determining a number of available signaling links in the linkset and determining whether that number has a first relationship with respect to a threshold value;
(ii) determining whether a first route associated with the linkset is a lowest cost route to a destination;
(iii) determining whether the first route is allowed; and
(iv) in response to determining that the number of available signaling links has the first relationship, the first route is the lowest cost route, and the first route is allowed, indicating that the first route is restricted and initiating a change-over process to direct signaling messages from adjacent nodes to a second route having a higher cost than the first route.

16. The method of claim 15 comprising:
(a) detecting a second change in status associated with at least one signaling link in the linkset; and
(b) in response to detecting the second change in status:
(i) determining whether the number of available signaling links in the linkset has a second predetermined relationship with respect to the threshold value; and
(ii) in response to determining that the number of available signaling links has the second predetermined relationship with respect to the threshold value, indicating that the first route is allowed and initiating a changeback procedure to switch signaling messages sent from adjacent nodes from the second route to the first route.

17. A system for routing a signaling message, the system comprising:
(a) a communication interface for sending and receiving signaling messages;
(b) a routing address translation function for receiving a signaling message from the communication interface and performing routing address translation processing; and
(c) a routing function for:
(i) receiving a signaling message that has undergone routing address translation processing and that is addressed to a signaling destination determined by the routing address translation processing;
(ii) determining whether an allowed route to the signaling destination exists;
(iii) in response to determining that an allowed route to the signaling destination exists, selecting the allowed route to the destination
(v) in response to determining that an allowed route to the signaling destination does not exist, selecting a restricted route to the destination; and
(vi) routing the signaling message over the selected route.

18. The system of claim 17 where the communication interface comprises a link interface module (LIM).

19. The system of claim 17 where the communication interface comprises a data communications module (DCM) module.

20. The system of claim 17 where the communication interface comprises a high-speed link (HSL) module.

21. The system of claim 17 wherein the routing address translation function is located on a database services module (DSM).

22. The system of claim 17 wherein the routing address translation function includes a global title translation application.

23. The system of claim 17 wherein the routing address translation function includes a flexible home location register (HLR) routing application.

24. The system of claim 17 wherein the routing address translation function includes a number portability application.

25. The system of claim 17 wherein the routing address translation function includes an E.164 numbering (ENUM) application.

26. The system of claim 17 wherein the routing function is adapted to receive an MTP-routed signaling message that does not require routing address translation and to perform steps (c)(ii)-c(iv) for the MTP-routed signaling message.

27. The system of claim 17 wherein selecting an allowed route to the destination includes selecting the lowest cost allowed route to the destination.

28. The system of claim 17 wherein selecting a restricted route to the destination includes selecting the lowest cost restricted route to the destination.

29. The system of claim 17 comprising a network management function for generating a transfer restricted message in response to determining that a route is restricted.

30. A computer program product comprising computer-executable instructions embodied in a computer-readable medium for performing steps comprising:

(a) detecting a change in status associated with a signaling link in a signaling linkset;

(b) in response to detecting the change in the status, determining a number of available signaling links in the linkset and determining whether that number has a first or a second relationship with respect to a threshold value;

(c) in response to determining that the number of available signaling links in the linkset is has the first relationship with respect to the threshold value, indicating that a route associated with the linkset is allowed; and (d) in response to determining that the number of available signaling links in the linkset has the second predetermined relationship with respect to the threshold value, indicating that the route associated with the linkset is restricted.

* * * * *